(12) United States Patent
Egli

(10) Patent No.: US 7,125,966 B2
(45) Date of Patent: Oct. 24, 2006

(54) AZO COMPOUNDS

(75) Inventor: Robert Egli, Therwil (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/531,866

(22) PCT Filed: Oct. 17, 2003

(86) PCT No.: PCT/IB03/04611

§ 371 (c)(1),
(2), (4) Date: Apr. 18, 2005

(87) PCT Pub. No.: WO2004/035690

PCT Pub. Date: Apr. 29, 2004

(65) Prior Publication Data

US 2006/0142554 A1      Jun. 29, 2006

(30) Foreign Application Priority Data

Oct. 18, 2002  (EP) .................. 02405894
Oct. 22, 2002  (GB) .................. 0224513.2

(51) Int. Cl.
| | | |
|---|---|---|
| C09B 29/033 | (2006.01) | |
| C09B 29/09 | (2006.01) | |
| C09B 29/42 | (2006.01) | |
| C09B 56/00 | (2006.01) | |
| C09B 67/22 | (2006.01) | |
| C09D 11/02 | (2006.01) | |

(52) U.S. Cl. ................ 534/765; 534/766; 534/769; 534/777; 534/789; 8/528; 8/639; 8/662; 8/688; 106/31.29; 106/31.48; 106/31.5; 106/31.51

(58) Field of Classification Search .......... 534/765, 534/766, 769, 777, 789; 8/528, 639, 662, 8/688; 106/31.29, 31.48, 31.5, 31.51
See application file for complete search history.

(56) References Cited

U.S. PATENT DOCUMENTS

| | | | |
|---|---|---|---|
| 4,628,284 A | 12/1986 | Ohta et al. | |
| 4,703,113 A | 10/1987 | Baxter et al. | |
| 4,895,981 A | 1/1990 | Reinert et al. | |
| 4,963,189 A | 10/1990 | Hindagolla | |
| 5,082,892 A | 1/1992 | Haiko et al. | |
| 5,495,004 A | 2/1996 | Buhler | |
| 5,910,624 A | 6/1999 | Wanken et al. | |

FOREIGN PATENT DOCUMENTS

| | | |
|---|---|---|
| EP | 0 425 150 A2 | 5/1991 |
| EP | 0 554 695 A1 | 8/1993 |
| FR | 1 445 371 | 7/1966 |
| JP | 07-62594 * | 3/1995 |

OTHER PUBLICATIONS

Ma et al., New Journal of Chemistry, 26(10), 1456-1460, 2002.*
PCT Search Report for application No. PCT/IB 03/04611, Mail dated Feb. 1, 2004.
PCT International Prelimininary Examination Report for application No. PCT/IB 03/04611, mail dated Feb. 25, 2005.
English abstract for SU 1 325 050, 1988.
English abstract for FR 1 445 371, 1968.

* cited by examiner

*Primary Examiner*—Fiona T. Powers
(74) *Attorney, Agent, or Firm*—Tod A. Waldrop

(57) ABSTRACT

The present invention relates to novel dyestuffs of formula (I) wherein the substituents have the meanings defined in the claims, the production of such dyestuffs, the use of these dyestuffs and material dyed or printed by such dyestuffs

28 Claims, No Drawings

AZO COMPOUNDS

The present invention relates to novel disperse dyes, to their preparation, and to the use thereof for dyeing and printing regenerated or synthetic hydrophobic materials and/or blends comprising regenerated or synthetic hydrophobic materials.

The present invention relates to novel dyestuffs of formula (I)

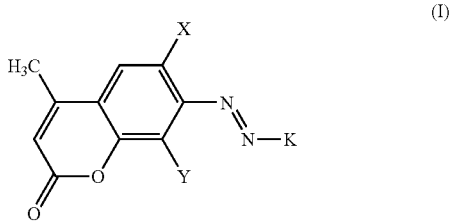

wherein
X signifies H; halogen, preferably Cl or Br; —CN; —SO$_2$CH$_3$; —OH; —OCH$_3$ or —NO$_2$,
Y signifies H; halogen, preferably Cl or Br; or —CN, and
K signifies a coupling component radical of the 6-hydroxypyridone-2, aniline, α-naphthylamine, 5-aminopyrazole, 5-hydroxypyrazole, indole, tetrahydrochinoline, 2-aminothiazole, 2-aminothiophene, phenole which is not 3,5-dimethyl substituted and the substituents in the 3 and 5 position are not members of a second ring, 2-naphthol, benzomorpholine or 2,6-diaminopyridine series.

In formula I, preferably
X signifies H; halogen, preferably Cl or Br; —CN, or —NO$_2$,
Y signifies H; halogen, preferably Cl or Br; or —CN, and
K signifies a coupling component radical of the ~6-hydroxypyridone-2, aniline, α-naphthylamine, 5-aminopyrazole, 5-hydroxypyrazole, indole, tetrahydrochinoline, 2-aminothiazole, 2-aminothiophene, 2-naphthol, benzomorpholine or 2,6-diaminopyridine series.

More preferred coupling component radical K are of 5-hydroxypyrazole, 6-hydroxypyridone-2 or aniline series.

More preferred coupling component radical K are of the 6-hydroxypyridone-2 or aniline series.

The most preferred coupling component radical K is of the 5-hydroxypyrazole serie.

Particularly preferred are dyestuffs of formula (I-A)

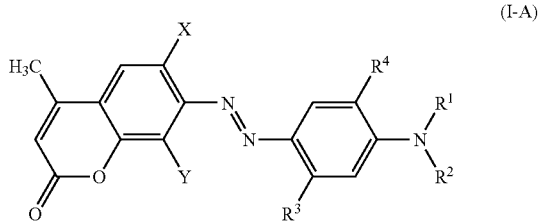

wherein
X signifies H; halogen, preferably Cl or Br; —CN, —OH; —OCH$_3$ or —NO$_2$,
Y signifies H; halogen, preferably Cl or Br; or —CN, and
R$^1$ signifies C$_{1-6}$-alkyl; substituted C$_{2-4}$-alkyl, preferably substituted by one or more substituents of the group consisting of halogen, —CN, —SCN —OC$_{1-4}$-alkyl, —OCOC$_{1-3}$-alkyl, —OCHO, —OC$_6$H$_5$ and —C$_6$H$_5$; C$_{3-4}$-alkenyl; substituted C$_{3-4}$-alkenyl, preferably substituted by —Cl or —Br; C$_{3-4}$-alkinyl, preferably propargyl; C$_{2-4}$-alkylene-OCO—C$_{1-3}$-alkyl; C$_{2-4}$-alkylene-O(CO)O—C$_{1-3}$-alkyl; C$_{1-3}$alkylene-COO—R$^5$; —C$_{1-3}$-alkylene-COO—C$_{2-3}$-alkylene-N-phthalimid; C$^{1-3}$-alkylene-COOCH$_2$COOR$^5$ or C$_{1-3}$-alkylene-COOCH$_2$COR$^6$,
wherein R$^5$ signifies C$_{1-4}$-alkyl; C$_{1-2}$-alkoxyethyl; C$_{3-4}$-alkenyl; C$_{3-4}$-alkinyl; cinnamyl; phenoxyethyl; phenyl-C$_{1-3}$alkyl; tetrahydro-furfuryl-2; phenyl or phenyl, which is substituted by —CH$_3$, —OCH$_3$, —COOCH$_3$ or —COOC$_2$H$_5$,
R$^6$ signifies C$_{1-4}$-alkyl; phenyl or substituted phenyl, preferably substituted by one or more substituents of the group consisting of —CH$_3$, —OCH$_3$, —OC$_2$H$_5$, halogen and —OH,
R$^2$ signifies H; C$_{1-6}$-alkyl; substituted C$_{2-4}$-alkyl, preferably substituted by one or more substituents of the group consisting of halogen, —CN, —OH, —OC$_{1-4}$-alkyl, —OCOC$_{1-3}$-alkyl, —OC$_6$H$_5$ and —C$_6$H$_5$; C$_{3-4}$-alkenyl; substituted C$_{3-4}$-alkenyl, preferably substituted by —Cl or —Br; C$_{3-4}$-alkinyl, preferably propargyl; C$_{2-4}$-alkylene-OCO—C$_{1-3}$-alkyl or C$_{1-3}$alkylene-COO—R$^5$,
R$^3$ signifies H; CH$_3$; —NHCO-A$^1$ or —NHCOO-A$^2$,
wherein
A$^1$ signifies H; C$_{1-4}$-alkyl; C$_{2-3}$-alkenyl; phenyl; —NH$_2$ or substituted C$_{1-2}$-alkyl, preferably substituted by one or more substituents of the group consisting of —OH, —Cl, —OCH$_3$, OC$_2$H$_5$ and —C$_6$H$_5$,
A$^2$ signifies C$_{1-4}$-alkyl or substituted C$_{2-4}$-alkyl, preferably substituted by one substituents of the group consisting of —Cl, —OCH$_3$ and —OC$_2$H$_5$, and
R$^4$ signifies H; halogen or Ct$_4$alkoxy, as well as mixtures thereof.

Further particularly preferred are dyestuffs of formula (I-B)

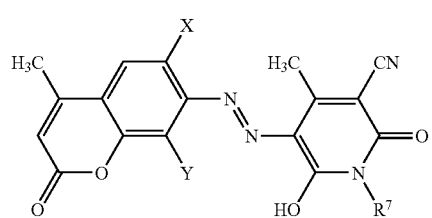

wherein
X signifies H; halogen, preferably Cl or Br; —OH; —OCH$_3$ or NO$_2$
Y signifies H,
R$^7$ signifies H; benzyl; phenyl; C$_{1-6}$-alkyl; substituted C$_{2-4}$-alkyl, preferably substituted by one substituent of the group consisting of halogen, —CN, —OH, —OC$_{1-4}$-alkyl, —OCOC$_{1-2}$-alkyl, —OC$_6$H$_5$ or —C$_6$H$_5$; —C$_{1-2}$-alkylene-COOC$_{1-2}$-alkyl; —NHC$_6$H$_5$ or —NH$_2$, as well as mixtures thereof Further particularly preferred are dyestuffs of formula (I—C)

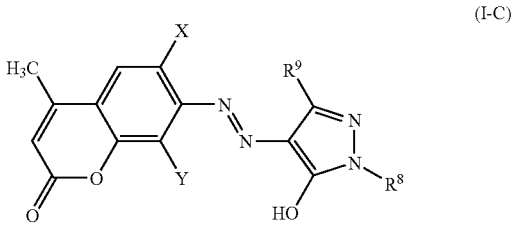

(I-C)

wherein

X signifies H; halogen, preferably Cl or Br; —OH; —OCH$_3$ or NO$_2$;

Y signifies H,

R$^8$ signifies H; C$_{1-6}$-alkyl; cyclo-hexyl; phenyl; substituted phenyl, preferably substituted by one substituent of the group consisting of halogen, —CH$_3$, —CN, —OH, —OC$_{1-4}$-alkyl, —OCOC$_{1-2}$-alkyl, —COC$_{1-2}$-alkyl, —COOH, —SO$_2$C$_2$H$_4$OH or —NO$_2$ R$^9$ signifies C$_{1-4}$-alkyl; phenyl or —CF$_3$, as well as mixtures thereof.

Any alkyl present is linear or branched unless indicated to the contrary.

Any substituted alkyl present can be optionally substituted by one or more identical or different substituent.

Halogen atoms are preferably chlorine or bromine.

The above-mentioned novel compounds as well as mixtures thereof are very useful disperse dyestuffs.

Production of these dyestuffs is effected by coupling a diazotized amine of formula (II)

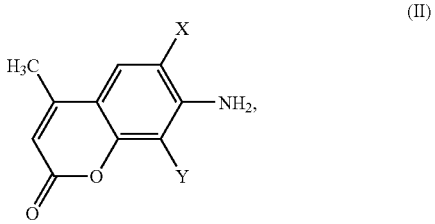

(II)

wherein all substituents have the meanings given in anyone of the preceding definition in the description is coupled with an amine of formula (III)

H—K  (III)

wherein all substituents have the meanings as defined above.

For the preparation of the cyano derivatives of compound (I) a further step may comprise the partially or complete cyanation of the bromo derivatives of the compound according to formula (I) wherein X and/or Y signifiy —Br.

Diazotization and coupling are effected by generally known processes.

The diazotization is carried out, for example using sodium nitrite in acid aqueous medium. The diazotization can also be carried out using other diazotization agents, for example nitrosyl sulfuric acid. An additional acid may be present in the reaction medium during diazotization, for example phosphoric acid, sulfuric acid, acetic acid, propionic acid, hydrochloric acid or mixtures of these acids, e.g. mixtures of phosphoric acid, and acetic acid. Diazotization is conveniently carried out within the temperature range of from −10 to 10° C., preferably from 0° C. to 5° C.

Coupling of the diazotized compound of formula (II) to the coupling component of formula H—K (III) is carried out in known manner, for example in acid, aqueous or aqueous-organic medium, preferably within the temperature range from 0° C. to 50° C., more preferably from 10° C. to 20° C. Acid used are, for example hydrochloric acid, acetic acid, sulfuric acid or phosphoric acid. For example diazotization and coupling can be carried out in the same reaction medium.

Alkali metal nitrites, such as, for example, sodium nitrite, in solid form or as an aqueous solution, or in nitrosylsulfuric acid are employed as the nitrosating agents.

The preparation of the diazonium ion, typically through the reaction with excess nitrous acid or the like such as nitrosyl sulfuric acid at low temperature to form the electrophilic ion Aryl-N$_2^+$ is published in the literature, e.g. in [Advanced Organic Chemistry, Fieser&Fieser, pages 736–740] or [Organische Chemie, K. Peter C. Vollhardt, pages 1154–1157, I. Auflage 1988].

The compound of formula (II), wherin X and Y signify hydrogen is known [V. F. Pozdnev, Khim Geterosikl. Soedin. 1990, 3, 312] and the compounds of formulae (III) may easily be produced in a manner familiar to the person skilled in the art.

The compound of formula (II), wherein X and/or Y signifie bromine group are synthesized analogously to example 1 in DE 196 43 769 A1.

The dyes of formula (I), wherein X and/or Y signify a cyano group are prepared analogously to example 1 of EP 554 695 A1 by exchange of the bromine by the —CN group.

The new dyestuffs of formula (I) as well as mixtures thereof can be used for dyeing and printing semisynthetic and, preferably, synthetic hydrophobic fiber materials, especially textile materials. Textile materials consisting of blended fabrics containing such semisynthetic hydrophobic fiber materials can also be dyed or printed by means of the dyes of this invention.

Suitable semisynthetic textile materials are mainly cellulose-2½ acetate, cellulose triacetate, polyamides and high molecular weight polyesters as well as mixtures thereof with cellulose.

Synthetic hydrophobic textile materials consist mainly of linear aromatic polyester, for example of those consisting of terephthalic acid and glycols, in particular ethylene glycol or condensate of terephthalic acid and 1,4-bis(hydroxymethyl) cyclohexane; of polycarbonates, e.g. those consisting of α,α-dimethyl-4,4'-dihydroxydiphenylmethane and phosgene, and of fibers based on polyvinyl chloride and polyamide.

The hydrophobic synthetic materials can be in the form of sheet-like or thread-like structures, and can be processed, for example, to yarns or woven, knitted or looped textile fabrics. The novel dyes are also suitable for dyeing hydrophobic synthetic material in the form of micro fibers.

It is expedient to convert the novel dyes according to formula (I) before use into a dye formulation. This is done by milling the dye to an average particle size of 0.1 to 10 micron. Milling can be carried out in the presence of dispersants. Typically, the wet dye is milled with a dispersant, and thereafter dried under vacuum or by spray drying. Printing pastes and dyebaths can be prepared by adding water to the formulation so obtained.

The new dyestuffs according to formula (1) are applied to the textile materials by known dyeing or printing methods, e.g. those described in French patent application No. 1.445.371.

Typically, polyester fiber materials are dyed from an aqueous dispersion by the exhaust process in the presence of customary anionic or non-ionic dispersants and in the presence or absence of customary swelling agents (carrier) in the temperature range from 65° C. to 140° C.

Cellulose-2½-acetate is preferably dyed at a temperature from 65° C. to 85° C. and cellulose triacetate at temperatures up to 115° C.

The novel dyes are suitable for dyeing by the thermosol process, for the exhaust process, the continuous process and for printing as for modern imaging processes, e.g. thermotransfer printing, ink-jet printing, hot melt inkjet printing or by conventional printing processes.

The thermosol process, the exhaust process and the continuous process are well known dyeing processes and are described for example in M. Peter and H. K. Rouette: "Grundlagen der Textilveredelung; Handbuch der Technologie, Verfahren und Maschinen", 13$^{th}$ revised Edition, 1989, Deutscher Fachverlag GmbH, Frankfurt am Main, Germany, ISBN 3-87150-2774; wherein the following pages are of special interest: pages 460–461, 482–495, 556–566 and 574–587.

In the inkjet printing process, individual droplets of the ink are sprayed from a nozzle onto a substrate in a controlled manner. The continuous inkjet method and the drop-on-demand method are employed predominantly for this purpose. In the case of the continuous inkjet method, the droplets are produced continuously and droplets not needed for printing are diverted into a collecting vessel and recycled. In the case of the discontinuous drop-on-demand method, by contrast, droplets are generated and printed as desired, i.e. droplets are only generated when this is necessary for printing. The droplets may be generated for example by means of a piezo inkjet head or by means of thermal energy (bubble jet).

In hot melt inkjet printer solid hot melt inks are loaded in a printer capable of melting the ink in the inkjet printer head, ejecting the liquid ink which quickly resolidifies upon impacting a substrate. Conventional hot melt inkjet printers operate with a printing head and inkjet temperature of about 120 to about 150° C. At those temperatures, the solid ink is melted to a low viscosity liquid, generally about 8 to 25 cP when measured at jetting temperature.

Conventional printing processes are well known and differ in the way the printing ink or printing paste is transferred to the substrate: For example, inks or pastes can be applied by raised type (e.g. letter press, flexographic), from a planar surface (lithographic), from a recessed surface (intaglio) or through a stencil (silk screen). Different methods of application and different substrates require different properties in the ink.

The dyeings are carried out from an aqueous liquor by the exhaust process, and the liquor ration can be chosen from a wide range, for example from 1:4 to 1:100, preferably from 1:6 to 1:50.

The dyeing time is from 20 to 90 minutes, preferably from 30 to 60 minutes. The dye liquors can additionally comprise other additives, for example dyeing auxiliaries, dispersants, wetting agents and antifoams.

The liquor may also comprise mineral acids, such as sulfuric acid or phosphoric acid, or conveniently also organic acids, for example formic acid or acetic acid and/or salts, such as ammonium acetate, ammonium sulfate or sodium sulfate. The acids mainly serve to adjust the pH of the dye liquors which is preferably in the range from 4 to 5.

The disperse dyes are usually present in the dye liquors in the form of a fine dispersion. Suitable dispersants for the preparation of this dispersion are e.g. anionic dispersants, such as aromatic sulfonic acid/formaldehyde condensates, sulfonated creosol oil/formaldehyde condensates, lignin sulfonates or copolymers of acrylic acid derivates, preferably aromatic sulfonic acid/formaldehyde condensates or lignin sulfonated, or nonionic dispersants based on polyalkylene oxides obtainable, for examples, by polyaddition reaction from ethylene oxide or propylene oxide. Further suitable dispersants are listed in U.S. Pat. No. 4,895,981 or in U.S. Pat. No. 5,910,624.

Suitable inks or pastes comprise a) at least one dye of the formula (1) or mixtures of compounds of the formula (I), b) water or a medium including a mixture of water and an organic solvent, an anhydrous organic solvent or a solid having a low melting point, and c) optionally further additives.

The inks or pastes preferably include a total amount of dyes of the above formula (I), which is in the range from 1 to 35% by weight, especially in the range from 2 to 35% by weight, preferably in the range from 2 to 30% by weight, more preferably in the range from 2.5 to 20% by weight, based on the total weight of the ink or paste.

The inks include 99–65% by weight, especially 98–65% by weight, preferably 98–70% by weight, more preferably 97.5–80% by weight, of an abovementioned medium b), which includes water or a mixture of water and an organic solvent, an anhydrous organic solvent or a solid having a low melting point.

When said medium b) is a mixture including water and an organic solvent or an anhydrous organic solvent, then the dye of formulae (I) or mixtures thereof are preferably completely dissolved in this medium.

Preferably the dye of formulae (I) or mixtures thereof have a solubility of not less than 2.5% by weight in this medium b) 0 at 20° C.

When the ink composition of the invention is used for printing papery substrates or hydrophobic substrates made of acetate-, polyester-, polyamide-, polyacrylnitrile-, polyvinylchloride- or polyurethane-polymers and blends thereof, the inks are preferably used together with the following compositions.

When the medium is a mixture of water and an organic solvent, the weight ratio of water to organic solvent is preferably in the range from 99:1 to 1:99, more preferably in the range from 99:1 to 50:50, particularly preferably in the range from 95:5 to 80:20. It is preferable for the organic solvent which is included in the mixture with water to be a water-soluble solvent or a mixture of various water-soluble solvents. Preferred water-soluble or partly water soluble organic solvents are $C_{1-6}$-alcohols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and keto alcohols, preferably acetone, methyl ethyl ketone, cyclohexanone and 4-hydroxy-4-methyl-2-pentanone; water-miscible ethers, preferably tetrahydrofuran and dioxane; diols, preferably diols possessing 2 to 12 carbon atoms, e.g. 1,5-pentanediol, ethylene glycol, propylene glycol, butylene glycol, pentylene glycol, hexylene glycol, thiodiglycol and oligo- and poly-alkylene glycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols possessing 2 to 12 carbon atoms, particularly preferably 2-methoxyethanol, 2-(2-methoxyethoxy)ethanol, 2-(2-ethoxyethoxy) ethanol, 2-[2-(2-methoxyethoxy)ethoxy]ethanol, 2-[2-(2-ethoxyethoxy)ethoxy]ethanol and ethylene glycol monoallyl ether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane.

In a preferred composition, the medium as per b) includes water and at least 2 or more, more preferably 2 to 8, water-soluble organic solvents.

Particularly preferred water-soluble solvents are cyclic amides, particularly 2-pyrrolidone, N-methylpyrrolidone and N-ethylpyrrolidone; diols, preferably 1,5-pentanediol, ethylene glycol, thiodiglycol, diethylene glycol and triethylene glycol; and mono-$C_{1-4}$-alkyl and di-$C_{1-4}$-alkyl ethers of diols, more preferably mono-$C_{1-4}$-alkyl ethers of diols possessing 2 to 12 carbon atoms, particularly preferably 2-[2-(2-methoxyethoxy)ethoxy]ethanol.

A preferred medium as per b) includes:
(i) 75 to 95 parts by weight of water and
(ii) 25 to 5 parts of one or more of the following solvents: diethylene glycol, 2-pyrrolidone, thiodiglycol, N-methylpyrrolidone, cyclohexanol, caprolactone, caprolactam and 1,5-pentanediol, wherein the parts are by weight and all parts of (i) and (ii) add up to 100.

Examples of further useful ink compositions including water and one or more organic solvents are found in the Patent Specifications U.S. Pat. No. 4,963,189, U.S. Pat. No. 4,703,113, U.S. Pat. No. 4,626,284 and EP 425150A.

When the medium as per b) includes an anhydrous (i.e. less than 1% by weight of water) organic solvent, this solvent will have a boiling point of 30 to 200° C., more preferably of 40–150° C., particularly preferably of 50–125° C.

The organic solvent can be water-insoluble, water-soluble or mixtures of such solvents. Preferred water-soluble organic solvents are all above-described water-soluble organic solvents and mixtures thereof.

Preferred water-insoluble solvents include inter alia aliphatic hydrocarbons; esters, preferably ethyl acetate; chlorinated hydrocarbons, preferably $CH_2Cl_2$–; and ethers, preferably diethyl ether; and mixtures thereof.

When the liquid medium as per b) includes a water-insoluble organic solvent, it is preferable to add a polar solvent to increase the solubility of the dye in the liquid medium.

Examples of such polar solvents are $C_{1-4}$-alcohols, preferably ethanol or propanol; ketones, preferably methyl ethyl ketone.

The anhydrous organic solvent can consist of a single solvent or a mixture of 2 or more different solvents.

When it is a mixture of different solvents, a mixture including 2 to 5 different anhydrous solvents is preferred. This makes it possible to provide a medium as per b) which permits good control of the drying properties and of the stability of the ink composition in storage.

Ink compositions including an anhydrous organic solvent or mixtures thereof are of particular interest when rapid drying times are required and especially when they are used for prints on hydrophobic and non-absorbing substrates, such as plastic, metal and glass.

Preferred low-melting media have a melting point of 60 to 140° C. Useful low-melting solids include long-chain fatty acids or alcohols, preferably those having a $C_{18-24}$-carbon chain, and sulphonamides. Conventional low-melting ink vehicles generally include various proportions of waxes, resins, plasticizers, tackifiers, viscosity modifiers and antioxidants.

The ink composition and the printing pastes of the invention may further include as auxiliaries additional components which are normally used in inkjet inks or printing pastes, for example buffers, viscosity improvers, surface tension improvers, fixation, accelerants, biozides, corrosion inhibitors, levelling agents, drying agents, humefactants, ink penetration additives, light stabilisers, UV absorbers, optical brighteners, coagulation reducers, ionic or nonionic surfactants and conducting salts.

These auxiliaries are preferably added in an amount of 0–5% by weight to inks. To printing pastes up to 70% by weight, especially up to 60% by weight, preferably up to 55% by weight, based on the total weight of the printing paste.

To prevent precipitations in the ink compositions of the invention, the dyes used have to be purified clean. This can be done with commonly known purifying methods.

When the compositions of the invention are used for printing textile fibre materials, preference is given to using the following compositions.

When printing textile fibre materials, useful additives, besides the solvents including water, are synthetic thickener, natural thickener or modified natural thikeners which may include water-soluble nonionic cellulose ethers, alginates or bean gum ether. All, the water-soluble nonionic cellulose ethers, the alginates and the bean gum ether, are used as thickeners to adjust the ink to a certain viscosity.

Useful water-soluble nonionic cellulose ethers include for example methyl-, ethyl-, hydroxyethyl-, methylhydroxyethyl-, hydroxypropyl- or hydroxypropylmethyl-cellulose. Preference is given to methylcellulose or in particular hydroxyethylcellulose. Cellulose ethers are customarily used in the ink in an amount of 0.01 to 2% by weight, especially 0.01 to 1% by weight, preferably 0.01 to 0.5% by weight, based on the total weight of the ink.

Useful alginates include in particular alkali metal alginates, preferably sodium alginate. These are customarily used in the ink in an amount of 0.01 to 2% by weight, especially 0.01 to 1% by weight, preferably 0.01 to 0.5% by weight, based on the total weight of the ink.

Printing pastes include up to 70% by weight thickening agents, preferably up to 55% by weight thickening agents. In printing pastes the thickening agents are used in an amount of 3 to 70% by weight, especially 5 to 60% by weight, preferably 7 to 55% by weight, based on the total weight of the printing paste.

In the ink jet printing process preference is given to ink compositions having a viscosity of 1 to 40 mPa·s, especially 5 to 40 mPa·s, preferably 10 to 40 mPa·s. Ink compositions having a viscosity of 10 to 35 mPa·s are particularly preferred.

Preference is given to ink compositions having a surface tension of 15–73 mN/m, especially 20–65 mN/m, particularly preferably 30–50 mN/m. aPreference is given to ink compositions having a conductivity of 0.1–100 mS/cm, especially 0.5–70 mS/cm, particularly preferably 1.0–60 mS/cm.

The inks may further include buffer substances, for example acetate, phospate, borax, borate or citrate. Examples are sodium acetate, di-sodium hydrogen phosphate, sodium borate, sodium tetraborate and sodium citrate.

The dyeings or printings thus obtained, have good all-round fastness; particularly noticeable are the thermo-migration fastness, thermo-fixation-, and pleating fastness, as well as the excellent wet fastness.

The dyestuffs of the present invention are useful for pigmenting macromolecular organic materials of natural or synthetic origin, for example plastics, resins, varnishes, paints, electrophotographic toners and developers, electret materials, colour filters and also inks, including printing inks, and seed.

Macromolecular organic materials pigmentable using the dyestuffs of the present invention include for example cellulose compounds, such as for example cellulose ethers and esters, such as ethylcellulose, nitrocellulose, cellulose acetates or cellulose butyrates, natural binders, such as for example fatty acids, fatty oils, resins and their conversion products, or synthetic resins, such as polycondensates, polyadducts, addition polymers and copolymers, such as for example amino resins, especially urea- and melamine-formaldehyde resins, alkyd resins, acrylic resins, phenoplasts and phenolic resins, such as novolaks or resols, urea resins, polyvinyls, such as polyvinyl alcohols, polyvinyl acetals, polyvinyl acetates or polyvinyl ethers, polycarbonates, polyolefins, such as polystyrene, polyvinyl chloride, polyethylene or polypropylene, poly(meth)acrylates and their copolymers, such as polyacrylic esters or polyacrylonitriles, polyamides, polyesters, polyurethanes, coumarone-indene and hydrocarbon resins, epoxy resins, unsaturated synthetic resins (polyesters, acrylates) being different curing mechanisms, waxes, aldehydic and ketonic resins, gum, rubber and its derivatives and latices, casein, silicones and silicone resins; individually or in mixtures.

It is immaterial in this connection whether the macromolecular organic compounds mentioned are present as plastically deformable compositions, melts or in the form of dopes, dispersions, varnishes, paints or printing inks. Depending on the intended application, it will be advantageous to use the dyestuffs of the present invention as a blend or in the form of preparations or dispersions. Based on the macromolecular organic material to be pigmented, the dyestuffs of the present invention are used in an amount of 0.05% to 30% by weight and preferably 0.1% to 15% by weight.

Instead of a ground and/or finished pigment composition of the present invention it is in some cases also possible to use a corresponding crude having a BET surface area of more than 2 m$^2$/g and preferably more than 5 m$^2$/g. This crude can be used for the production of colour concentrates in liquid or solid form in concentrations of 5% to 99% by weight, alone or optionally mixed with other crudes or ready-produced pigments.

The dyestuffs of the present invention are also useful as colorants in electrophotographic toners and developers, such as for example one- or two-component powder toners (also known as one- or two-component developers), magnetic toners, liquid toners, addition polymerization toners and also speciality toners.

Typical toner binders are addition polymerization, polyaddition and polycondensation resins, such as styrene, styrene-acrylate, styrene-butadiene, acrylate, polyester, phenol-epoxy resins, polysulphones, polyurethanes, individually or in combination, and also polyethylene and polypropylene, which may each include further ingredients, such as charge control agents, waxes or flow assistants, or are subsequently modified with these additives.

The dyestuffs of the present invention are further useful as colorants in powders and powder coatings, especially in triboelectrically or electrokinetically sprayable powder coatings used for surface coating of objects composed for example of metal, wood, plastic, glass, ceramic, concrete, textile material, paper or rubber.

Powder coating resins used are typically epoxy resins, carboxyl- and hydroxyl-containing polyester resins, polyurethane and acrylic resins together with customary hardeners. Combinations of resins are also used. For instance, epoxy resins are frequently used in combination with carboxyl- and hydroxyl-containing polyester resins. Typical hardener components (depending on the resin system) include for example acid anhydrides, imidazoles and also dicyandiamide and derivatives thereof, blocked isocyanates, bisacylurethanes, phenolic and melamine resins, triglycidyl isocyanurates, oxazolines and dicarboxylic acids.

The present invention is also directed to an optical layer comprising at least one dye compound of formula (I) or mixtures thereof. The present invention is further directed to a method for producing optical layers a comprising the following steps (a) providing a substrate
(b) dissolving a dye compound or a mixture of dye compounds of formula (I) or mixtures thereof in an organic solvent to form a solution,
(c) coating the solution (b) on the substrate (a);
(d) evaporating the solvent to form a dye layer.

Different methods may be employed for coating the solution (b) on the substrate (a). To provide for a thin and uniform film of the optical layer, the material is usually deposited by spin coating, vacuum evaporation, jet coating, rolling coating or soaking.

The organic solvent is selected from $C_{1-8}$ alcohol, halogen substituted $C_{1-8}$ alcohols, $C_{1-8}$ ketone, $C_{1-8}$ ether, halogen substituted $C_{1-4}$ alkane, or amides. Preferred alcohols $C_{1-8}$ alcohols or halogen substituted $C_{1-8}$ alcohols are selected from methanol, ethanol, isopropanol, diacetone alcohol (DAA), 2,2,3,3-tetrafluoropropanol, trichloroethanol, 2-chloroethanol, octafluoropentanol or hexafluorobutanol; the preferred $C_{1-8}$ ketones are selected from acetone, methylisobutylketone, methylethylketone, or 3-hydroxy-3-methyl-2-butanone; the preferred halogen substituted $C_{1-4}$ alkanes are selected from chloroform, dichloromethane or 1-chlorobutane; and the preferred amides are selected from dimethylformamide or dimethylacetamide.

In a preferred embodiment of the optical layer the optical layer is an optical data recording layer which forms part of an optical data recording media.

The construction of optical data recording media is known in the art. An optical data recording media generally comprises a substrate and a recording layer, the optical layer. Usually discs or wavers of organic polymeric materials are used as substrates. Thus preferred substrates according to the invention are polycarbonate (PC) or polymethylmethacrylate (PMMA). The substrate has to provide an even and uniform surface of high optical quality. The optical layer is deposited thereon in a thin and uniform film of high optical quality and defined thickness. Finally, a reflective layer, e.g. aluminium, gold or copper, is deposited upon the optical layer.

Advanced optical data recording media may comprise further layers, such as protective layers, adhesive layers or additional optical layers.

For the application as optrical data recording layer the spin coating process is the preferred method for coating the solution (b) on the substrate (a)

The present invention relates to the use of formula (I) in optical layers for optical data recording, preferably for optical data recording using a laser with a wavelength up to 500 nm.

The invention further relates to a write only read many (WORM) type optical data recording medium capable of recording and reproducing information with radiation of blue laser, which employs compounds according to formula (I) in the optical layer.

In the following examples, the parts and percentages are by weight. The temperatures are given in degrees Celsius.

EXAMPLE 1

Diazotization 17.5 parts of 7-amino-4-methylcoumarin are dissolved in 100 parts of water and 36.5 parts of 30% HCl, 75 parts of ice are added and afterwards during a period of 1 hour 6.9 parts of sodium nitrite as an aqueous solution (40%) are added at a temperature of 0–5° C. The solution is stirred for 2 hours at 0–5° C. and 0.1 part of aminosulfonic acid are added to destroy the excess of sodium nitrite.

Coupling

The previously prapared diazonium salt solution is added continuously to a solution of 20.6 parts of 1-N-butyl-3-cyano-6-hydroxy-4-methyl-pyridon-2 in 400 parts water at a temperature of 15–25° C. The suspension is stirred for 1 h at 25° C. and the pH is adjusted to 4 by addition of 10 parts of 30% sodium hydroxide solution. The suspension is stirred again for 1 h and the precipitated dyestuff is filtered off, washed with water and dried in the vacuum at 60° C.

The isolated dyestuff of formula (I)

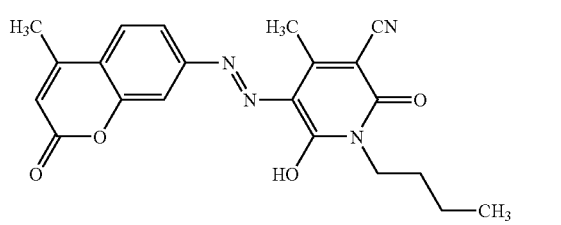

(IV)

has a $\lambda_{max}$ of 449 nm (in DMF) and dyes polyester in yellow shades with good fastness properties.

EXAMPLE 2

Diazotization

The diazotization is done analogously as in Example 1.

The previously prapared diazonium salt solution is added continuously to a solution of 10.3 parts of 1-N-butyl-3-cyano-6-hydroxy-4-methyl-pyridon-2 and 9.6 parts of —N-propyl-3-cyano-6-hydroxy-4-methyl-pyridon-2 in 400 parts water at a temperature of 15–25° C. The suspension is stirred for 1 h at 25° C. and the pH is adjusted to 4 by addition of 10 parts of 30% sodium hydroxide solution. The suspension is stirred again for 1 h and the precipitated dyestuff is filtered off, washed with water and dried in the vacuum at 60° C.

The isolated dyestuff mixture of formula (V-A) and (V-B)

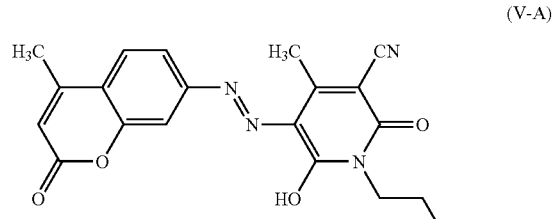

(V-A)

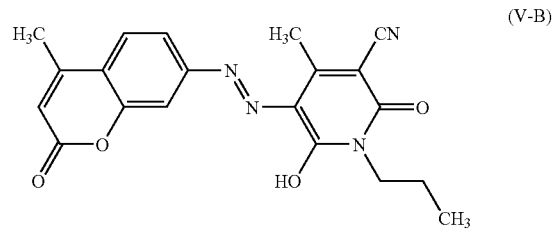

(V-B)

has a $\lambda_{max}$ of 449 nm (in DMF) and dyes polyester in yellow shades with good fastness properties.

Table 1, 2 and 3 below, give further dyestuffs of formula (I-A), (I-B) and (1-C), which are produced analogously to the procedures given in the preceding example.

All dyestuffs dye polyester fiber material with very good all-round fastness, especially fastness to light, sublimation and wet fastness.

TABLE 1

Examples 3–31

(I-A)

| Ex. No. | X | Y | R⁴ | R³ | R² | R¹ | $\lambda_{max}$ DMF [nm] |
|---|---|---|---|---|---|---|---|
| 3 | H | H | H | H | —CH$_2$CH$_3$ | —CH$_2$CH$_2$—CN | 455 |
| 4 | H | H | H | —CH$_3$ | —CH$_2$CH$_3$ | —CH$_2$CH$_2$—CN | 467 |
| 5 | H | H | H | —CH$_3$ | —CH$_3$ | —CH$_2$CH$_2$—CN | 462 |
| 6 | H | H | H | H | —CH$_2$—CH=CH$_2$ | —CH$_2$CH$_2$—CN | 460 |
| 7 | H | H | H | H | —CH$_2$C≡CH | —CH$_2$CH$_2$—CN | 451 |
| 8 | H | H | H | H | —CH$_2$CH(OH)CH$_3$ | —CH$_2$CH$_2$—CN | 456 |
| 9 | H | H | H | H | —CH$_2$CH$_2$OCOCH$_3$ | —CH$_2$CH$_2$OCOCH$_3$ | 451 |
| 10 | H | H | H | H | —CH$_2$CH$_2$COOCH$_3$ | —CH$_2$CH$_2$COOCH$_3$ | 449 |
| 11 | H | H | H | —NHCOCH$_3$ | —CH$_2$CH$_2$OCOCH$_3$ | —CH$_2$CH$_2$CN | 476 |
| 12 | H | H | H | —NHCOCH$_3$ | —CH$_2$CH$_2$OCOCH$_3$ | —CH$_2$CH$_2$OCOCH$_3$ | 486 |
| 13 | H | H | H | —NHCOCH$_3$ | —CH$_2$CH$_3$ | —CH$_2$CH$_3$ | 506 |
| 14 | Br | Br | H | —NHCOCH$_3$ | —CH$_2$CH$_3$ | —CH$_2$CH$_3$ | 554 |
| 15 | Br | CN | H | —NHCOCH$_3$ | —CH$_2$CH$_3$ | —CH$_2$CH$_3$ | 576 |
| 16 | H | H | H | —NHCOCH$_3$ | —CH$_2$CH$_3$ | —CH$_2$—CH=CH$_2$ | 501 |
| 17 | H | H | H | —NHCOCH$_3$ | —CH$_2$CH$_3$ | —CH$_2$—C$_6$H$_5$ | 499 |
| 18 | H | H | H | —NHCOCH$_3$ | —CH$_2$CH$_2$OCH$_3$ | —CH$_2$CH$_2$OCH$_3$ | 502 |
| 19 | H | H | H | —NHCOC$_2$H$_5$ | —CH$_2$CH$_3$ | —CH$_2$CH$_2$OC$_2$H$_5$ | 503 |
| 20 | H | H | H | —NHCOCH$_3$ | —CH$_2$CH$_3$ | —CH$_2$CH$_2$COOCH$_3$ | 498 |
| 21 | H | H | H | —NHCOCH$_2$Cl | —CH$_2$CH$_3$ | —CH$_2$CH$_3$ | 502 |
| 22 | H | H | H | —NHCOCH$_2$CH$_2$Cl | —CH$_2$CH$_3$ | —CH$_2$CH$_3$ | 503 |
| 23 | H | H | H | —NHCOCOOC$_2$H$_5$ | —CH$_2$CH$_3$ | —CH$_2$CH$_3$ | 501 |
| 24 | H | H | H | —NHCOCOOCH$_3$ | —CH$_2$CH$_3$ | —CH$_2$CH$_3$ | 500 |
| 25 | H | H | H | —NHCOCH$_2$OCH$_3$ | —CH$_2$CH$_3$ | —CH$_2$CH$_3$ | 503 |
| 26 | H | H | H | —NHCOCH$_3$ | —CH$_2$CH$_3$ | —CH$_2$CH$_2$COOCH$_2$COOCH$_3$ | 495 |
| 27 | H | H | H | —NHCOCH$_3$ | —CH$_2$CH$_3$ | —CH$_2$CH$_2$COOCH$_2$COOC$_2$H$_5$ | 496 |
| 28 | H | H | H | —NHCOCH$_3$ | —CH$_2$CH$_3$ | —CH$_2$CH$_2$COOCH$_2$C$_6$H$_5$ | 493 |
| 29 | H | H | H | —NHCOCH$_3$ | —CH$_2$CH$_3$ | —CH2CH2COOCH2COC$_6$H$_5$ | 490 |
| 30 | H | H | H | —NHCOCH$_3$ | —CH$_2$CH$_3$ | —CH$_2$CH$_2$COOC$_2$H$_4$—N-phthalimidyl | 497 |
| 31 | H | H | H | —CH$_3$ | —CH$_2$—CH=CH$_2$ | —CH$_2$CH$_2$—CN | 460 |

TABLE 2

Examples 32–41

(I-B)

| Ex. No. | X | Y | R⁷ | $\lambda_{max}$ DMF [nm] |
|---|---|---|---|---|
| 32 | H | H | —CH$_3$ | 446 |
| 33 | H | H | —CH$_2$CH$_3$ | 448 |
| 34 | H | H | —CH$_2$CH$_2$—CH$_3$ | 449 |
| 35 | H | H | —CH$_2$CH$_2$CH$_2$CH$_2$CH$_2$CH$_3$ | 449 |
| 36 | H | H | —CH$_2$CH$_2$CH$_2$—O—CH$_2$CH$_2$CH$_3$ | 448 |
| 37 | H | H | —CH$_2$—C$_6$H$_5$ | 449 |
| 38 | H | H | —CH$_2$CH$_2$—OH | 448 |
| 39 | H | H | —CH$_2$CH$_2$COOCH$_3$ | 449 |
| 40 | H | H | —CH$_2$COOCH$_3$ | 449 |
| 41 | H | H | —NH—C$_6$H$_5$ | 449 |

EXAMPLE 42

Diazotization 17.5 parts of 7-amino-4-methylcoumarin are dissolved in 100 parts of acetic acid at a temperature of 15° C. and 17.4 parts of 40% nitrosyl sulfuric acid are added within 15 minutes. The solution is stirred for 2 hours at 15° C.

Coupling

The previously prapared diazonium salt solution is added continuously to a solution of 17.4 parts of 3-methyl-1-phenyl-5-pyrazolone in 100 parts of N-methyl-pyrolidone and 50 parts of water containing 0.5 parts of aminosulfonic acid at a temperature of 15–25° C. The suspension is stirred for 1 h at 25° C. Then 100 parts of ice are added. The suspension is stirred for 30 minutes, the dyestuff suspension is filtered off, washed with water and dried in the vacuum at 60° C.

The isolated dyestuff of formula (VI)

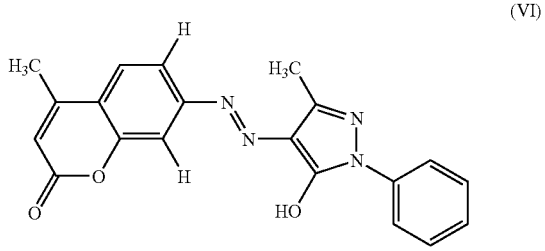

(VI)

has a $\lambda_{max}$ of 411 nm (in DMF) and dyes polyester in yellow shades with good fastness properties.

TABLE 3

Examples 42–65

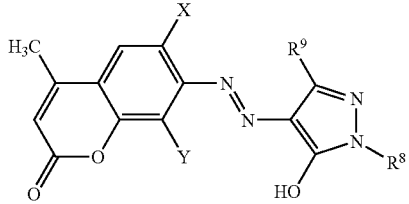

(I-C)

| Ex. No. | X | Y | R⁹ | R⁸ | $\lambda_{max}$ DMF [nm] |
|---|---|---|---|---|---|
| 42 | H | H | CH₃ | —C₆H₅ | 411 |
| 43 | H | H | C₂H₅ | —C₆H₅ | 413 |
| 44 | H | H | CF₃ | —C₆H₅ | 467 |
| 45 | H | H | CH₂CH₂CH₃ | —CH₃ | 407 |
| 46 | H | H | CH₃ | —H | 427 |
| 47 | H | H | CH₃ | —C₆H₄-2-CH₃ | 413 |
| 48 | H | H | CH₃ | —C₆H₄-3-CH₃ | 412 |
| 49 | H | H | CH₃ | —C₆H₄-4-CH₃ | 414 |
| 50 | H | H | CH₃ | —C₆H₄-2-OCH₃ | 411 |
| 51 | H | H | CH₃ | —C₆H₄-3-OCH₃ | 412 |
| 52 | H | H | CH₃ | —C₆H₄-4-OCH₃ | 410 |
| 53 | H | H | CH₃ | —C₆H₄-2-OH | 409 |
| 54 | H | H | CH₃ | —C₆H₄-3-OH | 411 |
| 55 | H | H | CH₃ | —C₆H₄-4-OH | 412 |
| 56 | H | H | CH₃ | —C₆H₄-2-COOH | 410 |
| 57 | H | H | CH₃ | —C₆H₄-3-Cl | 410 |
| 58 | H | H | CH₃ | —C₆H₄-4-COOC₂H₅ | 412 |
| 59 | H | H | COOC₂H₅ | —C₆H₅ | 437 |
| 60 | H | H | CH₃ | —CH₂CHOHCH₃ | 405 |
| 61 | H | H | CH₃ | —CH₂CHOHC₂H₅ | 407 |
| 62 | H | H | CH₃ | -cyclo-hexyl | 404 |
| 63 | H | H | CH₃ | —C₆H₄-4-SO₂C₂H₄OH | 414 |
| 64 | H | H | CH₃ | —C₆H₄-4-NO₂ | 418 |
| 65 | H | H | CH₃ | —COCH₃ | 435 |

APPLICATION EXAMPLE A 17.5 parts of the dyestuff according to example 1 in the form of the moist presscake are wet-ground by a known method with 32.5 parts of a commercial dispersing agent based on lignin sulfonates, and pulverized to a powder. 1.2 parts of this dye preparation are added to 2000 parts of demineralized water of 70° C., which contains 40 parts of ammonium sulfate; the pH value of the dye bath is set at 5 with 85% formic acid. 100 parts of washed polyester fiber fabric are placed in this dye bath, the container is closed, heated to 130° C. over the course of 20 minutes, and dyeing continues for a further 60 minutes at this temperature. After cooling, the polyester fiber fabric is removed from the dye bath, rinsed, soaped and cleaned by reduction with sodium hydrosulfite in the usual way. After thermo-fixation (180° C., 30 sec), a yellow dyeing is obtained with very good all-round fastness, especially fastness to light and sublimation, in particular excellent wet fastness. The dyestuffs of examples 2 to 65 may be used in analogous manner, and dyeings with very good all-round fastness are obtained.

Dyeing polyester yarn can be carried out analogously with examples 2 to 65.

APPLICATION EXAMPLE B 2.5 parts of the dyestuff obtained in Example 1 are dissolved with stirring at 25° C. in a mixture of 20 parts diethyleneglycol and 77.5 parts water to obtain a printing ink suitable for ink jet printing.

The dyestuffs of examples 2 to 65 or dyestuff mixtures of Examples 1 to 65 can also be used in a manner analogous to that described in Application Example B.

APPLICATION EXAMPLE C

A printing paste according to the invention consists of 500 g of a thickener (bean gum ether e.g. Indalca ™),
10 g of a fixation accelerant (e.g. Printogen HDN ™),
10 g of a levelling agent (e.g. Sandogen CN ™),
10 g of a buffer and dispersant system for dyeing (eg. Sandacid PB ™; 1:2) and
10 g of a dye of example 1 and adding water up to 1000 g.

(Indalca was purchased from Cesalpinia S.p.A, Italy; Sandogen, Printogen and Sandacid are a trademarks of Clariant AG, Muttenz/Switzerland.)

This printing paste is used for printing papery substrates, textile fibre materials and plastic films and plastic transparencies.

The dyestuffs of examples 2 to 65 or dyestuff mixtures of Examples 1 to 65 can also be used in a manner analogous to that described in Application Example C.

APPLICATION EXAMPLE D

A polyester Interlock fabric was printed with a conventional printing machine using the painting paste of the APPLICATION EXAMPLE C. The resulting printed fabric is dried for 3 minutes at 110° C. and then treated with hot steam for 7 minutes at 175° C. The fabric was rinsed with cold tap water for 5 minutes, and then rinsed for 5 minutes with demineralised water. The so treated fabric was reductively cleansed in a bath comprising 4 g/l Na$_2$CO$_3$, 2 g/l hydrosulfite sodium salt (85%) and 1 g/l Lyogen DFT™ (Trademark of Clariant AG, Muttenz, Switzerland). Further rinsing for 15 minutes with tap water was followed by a final drying step. This leaves a polyester fabric with a yellow print with very good all-round fastness, especially fastness to light and sublimation and wet fastness.

The dyestuffs of examples 2 to 65 or dyestuff mixtures of Examples 1 to 65 can also be used in a manner analogous to that described in Application Example D.

APPLICATION EXAMPLE E

The ink jet printing composition is preferably prepared by heating the medium to 40° C. and then adding a dye of the example 1. The mixture is stirred until the dyes are dissolved. The composition is then cooled down to room temperature and the further ingredients are added.

The fractions of the individual components of the ink compositions

| | |
|---|---|
| 6 parts | of the dye of example 1, |
| 20 parts | of glycerol and |
| 74 parts | of water. |

This ink composition is used for printing papery substrates, textile fibre materials and plastic films and plastic transparencies.

The dyestuffs of examples 2 to 65 or dyestuff mixtures of Examples 1 to 65 can also be used in a manner analogous to that described in Application Example E.

APPLICATION EXAMPLE F

A polyester Interlock fabric was ink jet printed using the printing ink of the APPLICATION EXAMPLE E. The printed fabric was treated analougusly to the post printing treatment of APPLICATION EXAMPLE D. This leaves a polyester fabric with a yellow print with very good all-round fastness, especially fastness to light and sublimation, in particular excellent wet fastness.

The dyestuffs of examples 2 to 65 or dyestuff mixtures of Examples 1 to 65 can also be used in a manner analogous to that described in Application Example F.

The invention claimed is:

1. A dyestuff or a mixture of dyestuffs of formula (I)

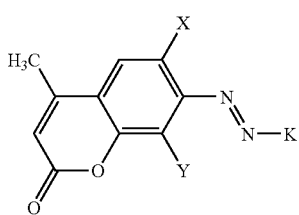

(I)

wherein
X is H; halogen, —CN; —SO$_2$CH$_3$; —OH; —OCH$_3$ or —NO$_2$,
Y is H; halogen, or —CN, and
K is a coupling component radical of the 6-hydroxypyridone-2, aniline, a-naphthylamine, 5-aminopyrazole, 5-hydroxypyrazole, indole, tetrahydrochinoline, 2-aminothiazole, 2-aminothiophene, phenole which is not 3,5-dimethyl substituted and the substituents in the 3 and 5 position are not members of a second ring, 2-naphthol, benzomorpholine or 2,6-diaminopyridine series.

2. A dyestuff or mixture of dyestuffs according to claim 1 of formula (I-B)

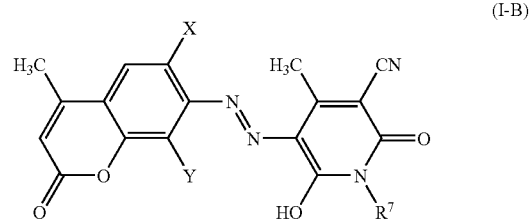

(I-B)

wherein
X is H; halogen, —OH; —OCH$_3$ or NO$_2$
Y is H,
R$^7$ is H; benzyl; phenyl; C$_{1-6}$-alkyl; substituted C$_{2-4}$-alkyl, C$_{1-2}$-alkylene-COOC$_{1-2}$-alkyl; —NHC$_6$H$_5$ or —NH$_2$, as well as mixtures thereof.

3. A dyestuff or mixture of dyestuffs according to claim 1 of formula (I-A)

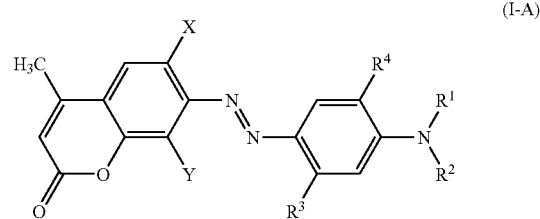

(I-A)

wherein
X is H; halogen, —CN, —OH; —OCH$_3$ or —NO$_2$,
Y is H; halogen, or —CN, and
R$^1$ is C$_{1-6}$-alkyl; substituted C$_{2-4}$-alkyl, C$_{3-4}$-alkenyl; substituted C$_{3-4}$-alkenyl, C$_{3-4}$-alkinyl, C$_{2-4}$-alkylene-OCO—C$_{1-3}$-alkyl; C$_{2-4}$-alkylene-O(CO)O—C$_{1-3}$-alkyl; C$_{1-3}$alkylene-COO—R$^5$; —C$_{1-3}$-alkylene-COO—C$_{2-3}$-alkylene-N-phthalimid; C$^{1-3}$-alkylene-COOCH$_2$COOR$^5$ or C$_{1-3}$-alkylene-COOCH$_2$COR$^6$,
R$^5$ is C$_{1-4}$-alkyl; C$_{1-2}$-alkoxyethyl; C$_{3-4}$-alkenyl; C$_{3-4}$-alkinyl; cinnamyl; phenoxyethyl; phenyl-C$_{1-3}$alkyl; tetrahydrofurfuryl-2; phenyl or phenyl, substituted by —CH$_3$, —OCH$_3$, —COOCH$_3$ or —COOC$_2$H$_5$,
R$^6$ is C$_{1-4}$-alkyl; phenyl or substituted phenyl,
R$^2$ is H; C$_{1-6}$-alkyl; substituted C$_{2-4}$-alkyl, C$_{3-4}$-alkenyl; substituted C$_{3-4}$-alkenyl,
C$_{3-4}$-alkinyl, preferably propargyl;
C$_{2-4}$-alkylene-OCO—C$_{1-3}$-alkyl or C$_{1-3}$alkylene-COO—R$^5$,
R$^3$ is H; CH$_3$—; —NHCO—A$^1$ or —NHCOO—A$^2$,
wherein
A$^1$ is H; C$_{1-4}$-alkyl; C$_{2-3}$-alkenyl; phenyl; —NH$_2$ or substituted C$_{1-2}$-alkyl,
A$^2$ is C$_{1-4}$-alkyl or substituted C$_{2-4}$-alkyl, and
R$^4$ is H; halogen or C$_{1-4}$alkoxy.

4. A dyestuff of mixture of dyestuffs according to claim 1 of formula (I-C)

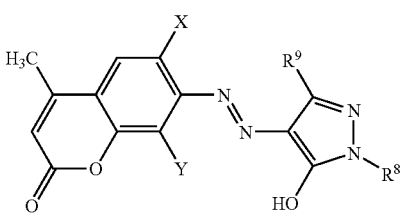

wherein
X is H; halogen, —OH; —OCH₃ or NO₂;
Y is H,
R⁸ is H; C₁₋₆-alkyl; cyclo-hexyl; phenyl; substituted phenyl,
R⁹ is C₁₋₄-alkyl; phenyl or —CF₃.

5. A process for the production of a dyestuff of formula (I), according to claim 1 comprising the step of coupling a diazotized amine of formula (II)

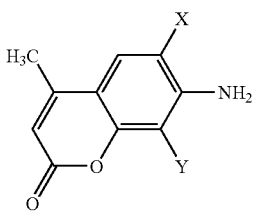

with an amine of formula (III)

H—K    (III).

6. A dyed or printed fiber or thread dyed with a dyestuff or a mixture of dyestuffs according to claim 1, wherein the fiber or thread comprise, fully or semi-synthetic, hydrophobic, organic materials.

7. An inkjet for an inkjet printing process or hot melt inkjet process comprising a dyestuff or mixture of dyestuffs according to claim 1.

8. A composition comprising a dyestuff or a mixture of dyestuffs according to claim 1.

9. The composition according to claim 8 wherein the composition is a printing paste, a printing ink, an inkjet printing ink or a hot melt inkjet printing ink.

10. Fibers or threads or materials produced thereof, wherein the fibers or threads comprise fully or semi-synthetic, hydrophobic, organic materials dyed or printed with a dyestuff or a mixture of dyestuffs as claimed in claim 2.

11. A dyestuff or mixture of dyestuffs according to claim 1, wherein X is Cl or Br.

12. A dyestuff or mixture of dyestuffs according to claim 1, wherein Y is Cl or Br.

13. A dyestuff or mixture of dyestuffs according to claim 2, wherein X is Cl or Br.

14. A dyestuff or mixture of dyestuffs according to claim 2, wherein the substituted $C_{2-4}$-alkyl is substituted by one substituent selected from the group consisting of halogen, —CN, —OH, —OC₁₋₄-alkyl, —OCOC₁₋₂-alkyl, —OC₆H₅ and —C₆H₅.

15. A dyestuff or mixture of dyestuffs according to claim 3, wherein X is Cl or Br.

16. A dyestuff or mixture of dyestuffs according to claim 3, wherein Y is Cl or Br.

17. A dyestuff or mixture of dyestuffs according to claim 3, wherein substituted $C_{2-4}$-alkyl of $R^1$ is substituted by one or more substituents selected from the group consisting of halogen, —CN, —SCN —OC₁₋₄-alkyl, —OCOC₁₋₃-alkyl, —OCHO, —OC₆H₅ and —C₆H₅.

18. A dyestuff or mixture of dyestuffs according to claim 3, wherein the substituted $C_{3-4}$-alkenyl of $R^1$ is substituted by —Cl or —Br.

19. A dyestuff or mixture of dyestuffs according to claim 3, wherein the $C_{3-4}$-alkinyl of $R^1$ is propargyl.

20. A dyestuff or mixture of dyestuffs according to claim 3, wherein the substituted phenyl of $R^6$ is substituted by one or more substituents selected from the group consisting of —CH₃, —OCH₃, —OC₂H₅, halogen and —OH.

21. A dyestuff or mixture of dyestuffs according to claim 3, wherein the substituted $C_{2-4}$-alkyl of $R^2$ is substituted by one or more substituents selected from the group consisting of halogen, —CN, —OH, —OC₁₋₄-alkyl, —OCOC₁₋₃-alkyl, —OC₆H₅ and —C₆H₅.

22. A dyestuff or mixture of dyestuffs according to claim 3, wherein the substituted $C_{3-4}$-alkenyl of $R^2$ is substituted by —Cl or —Br.

23. A dyestuff or mixture of dyestuffs according to claim 3, wherein the $C_{3-4}$-alkinyl of $R^2$ is propargyl.

24. A dyestuff or mixture of dyestuffs according to claim 3, wherein the substituted $C_{1-2}$-alkyl of $A^1$ is substituted by one or more substituents selected from the group consisting of —OH, —Cl, —OCH₃, OC₂H₅ and —C₆H₅.

25. A dyestuff or mixture of dyestuffs according to claim 3, wherein the substituted $C_{2-4}$-alkyl of $A^2$ is substituted by one substituents selected from the group consisting of —Cl, —OCH₃ and —OC₂H₅.

26. A dyestuff or mixture of dyestuffs according to claim 4, wherein X is Cl or Br.

27. A dyestuff or mixture of dyestuffs according to claim 4, wherein the substituted phenyl of $R^8$ is substituted by one substituent selected from the group consisting of halogen, —CH₃, —CN, —OH, —OC₁₋₄-alkyl, —OCOC₁₋₂-alkyl, —COC₁₋₂-alkyl, —COOH, —SO₂C₂H₄OH and —NO₂.

28. A material comprising the dyed or printed fiber or thread according to claim 6.

* * * * *